US012768594B2

(12) United States Patent
Kim

(10) Patent No.: US 12,768,594 B2
(45) Date of Patent: Oct. 20, 2026

(54) ELECTRODE SHEET DRYING DEVICE AND DRYING METHOD

(71) Applicant: LG Energy Solution, Ltd., Seoul (KR)

(72) Inventor: Dong Hae Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 629 days.

(21) Appl. No.: 18/273,939

(22) PCT Filed: Dec. 21, 2022

(86) PCT No.: PCT/KR2022/020994

§ 371 (c)(1),
(2) Date: Jul. 24, 2023

(87) PCT Pub. No.: WO2023/121313

PCT Pub. Date: Jun. 29, 2023

(65) Prior Publication Data

US 2024/0125552 A1 Apr. 18, 2024

(30) Foreign Application Priority Data

Dec. 22, 2021 (KR) ........................ 10-2021-0184673

(51) Int. Cl.
*F26B 13/16* (2006.01)
*F26B 3/04* (2006.01)
(Continued)

(52) U.S. Cl.
CPC ................ *F26B 13/16* (2013.01); *F26B 3/04* (2013.01); *F26B 13/001* (2013.01); *H01M 4/0471* (2013.01)

(58) Field of Classification Search
CPC .......... F26B 13/16; F26B 3/04; F26B 13/001; F26B 21/25; F26B 13/002; F26B 13/007;
(Continued)

(56) References Cited

U.S. PATENT DOCUMENTS 5,176,305 A 1/1993 Baarfusser et al.
5,775,002 A 7/1998 Iwase et al.
(Continued)

FOREIGN PATENT DOCUMENTS

CN 211625992 U 10/2020
CN 113639542 A 11/2021
(Continued)

OTHER PUBLICATIONS

International Search Report for PCT/KR2022/020994 mailed Mar. 29, 2023. 3 pgs.

(Continued)

*Primary Examiner* — David J Laux
(74) *Attorney, Agent, or Firm* — Lerner David LLP

(57) ABSTRACT

Disclosed herein relates to an electrode sheet drying device including a guide roller having a plurality of perforated holes formed on the outer circumferential surface, and the guide roller is configured to vacuum cling an electrode sheet to prevent an electrode sheet from being lifted from the guide roller during a drying process, thereby having an effect of mitigating the occurrence of creases in a non-coated part and preventing lifting of a current collector and the occurrence of cracks.

10 Claims, 7 Drawing Sheets

(51) Int. Cl.
*F26B 13/00* (2006.01)
*H01M 4/04* (2006.01)

(58) Field of Classification Search
CPC .......... F26B 13/26; F26B 13/10; F26B 25/14; H01M 4/0471; H01M 4/04; H01M 4/0404; H01M 4/139; B65G 47/91
See application file for complete search history.

(56) References Cited

U.S. PATENT DOCUMENTS

| | | | |
|---|---|---|---|
| 5,974,684 | A | 11/1999 | Steiner et al. |
| 2003/0230374 | A1 | 12/2003 | Yamana et al. |
| 2012/0285036 | A1 | 11/2012 | Matsuyama et al. |
| 2015/0217308 | A1 | 8/2015 | Toyoshima et al. |
| 2016/0216031 | A1 | 7/2016 | Fujiwara et al. |
| 2018/0313607 | A1 | 11/2018 | Böhn |
| 2020/0152967 | A1 | 5/2020 | Duong et al. |

FOREIGN PATENT DOCUMENTS

| | | | | | |
|---|---|---|---|---|---|
| CN | 113650277 | A | | 11/2021 | |
| EP | 0857821 | A2 | | 8/1998 | |
| JP | H9161780 | A | | 6/1997 | |
| JP | 2012251763 | A | | 12/2012 | |
| JP | 102921602 | A | | 2/2013 | |
| JP | 2014107237 | A | | 6/2014 | |
| JP | 2015036590 | A | * | 2/2015 | |
| JP | 2016049535 | A | | 4/2016 | |
| JP | 2017207236 | A | | 11/2017 | |
| JP | 6428536 | B2 | * | 11/2018 | |
| JP | 2020-053278 | A | | 4/2020 | |
| JP | 2021-113659 | A | | 8/2021 | |
| KR | 101073850 | B1 | | 10/2011 | |
| KR | 101181824 | B1 | | 9/2012 | |
| KR | 20130136076 | A | | 12/2013 | |
| KR | 20150020309 | A | | 2/2015 | |
| KR | 20150073494 | A | | 7/2015 | |
| KR | 2016-0046864 | A | | 4/2016 | |
| KR | 2016-0091563 | A | | 8/2016 | |
| WO | WO-9734329 | A1 | * | 9/1997 | .............. H01M 4/12 |
| WO | 2017071862 | A1 | | 5/2017 | |

OTHER PUBLICATIONS

Extended European Search Report including Written Opinion for Application No. 22911946.6 dated Jul. 15, 2024, pp. 1-8.
Search Report dated Apr. 14, 2026 from the Office Action for Chinese Application No. 202280009591.1 issued Apr. 15, 2026, 3 pages.

* cited by examiner

[FIG. 1]
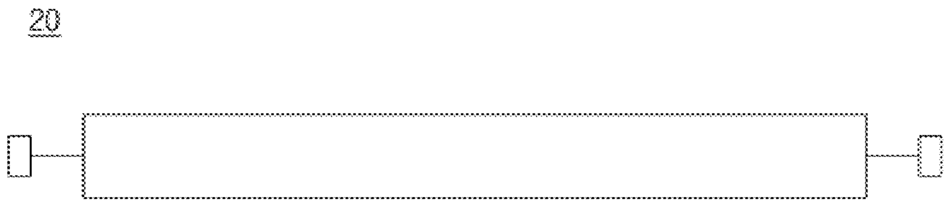
[FIG. 2]
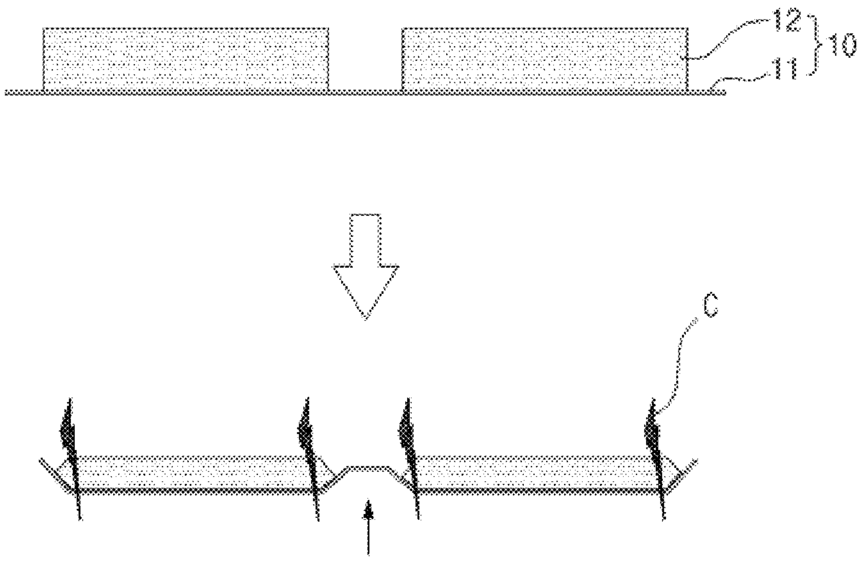

[FIG. 3]
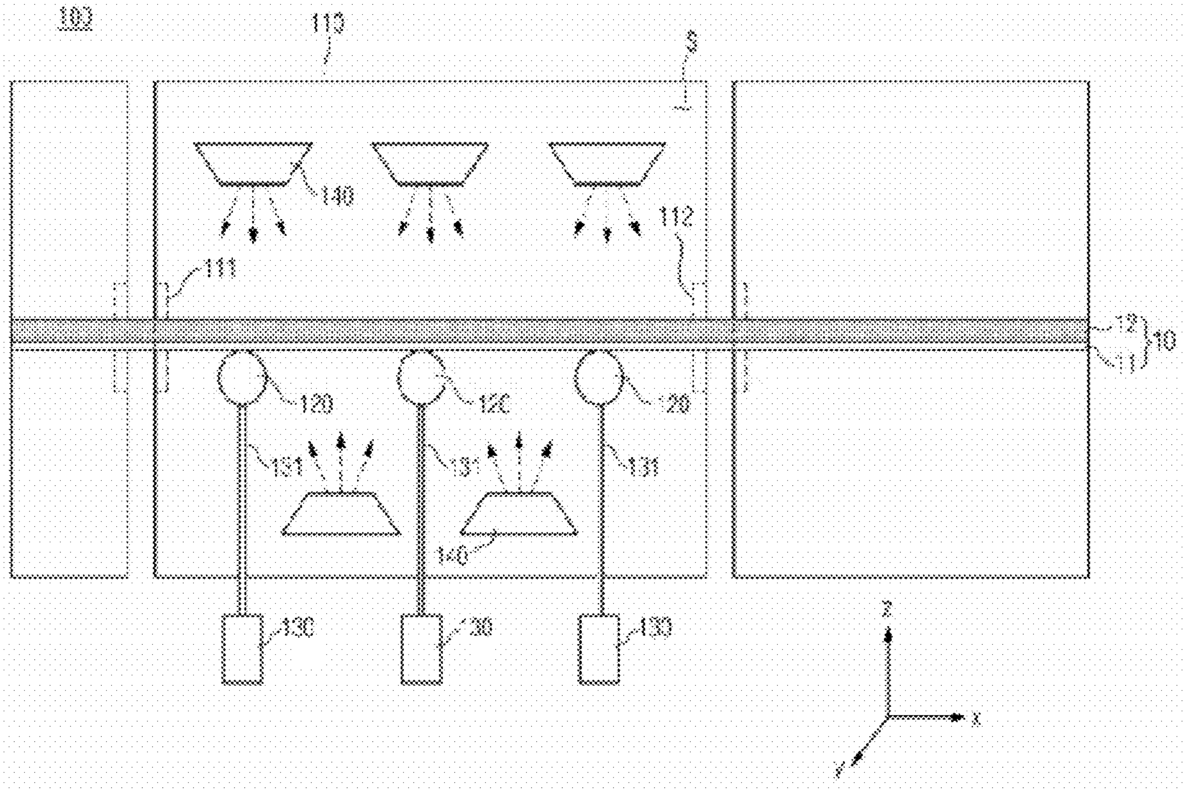

[FIG. 4]
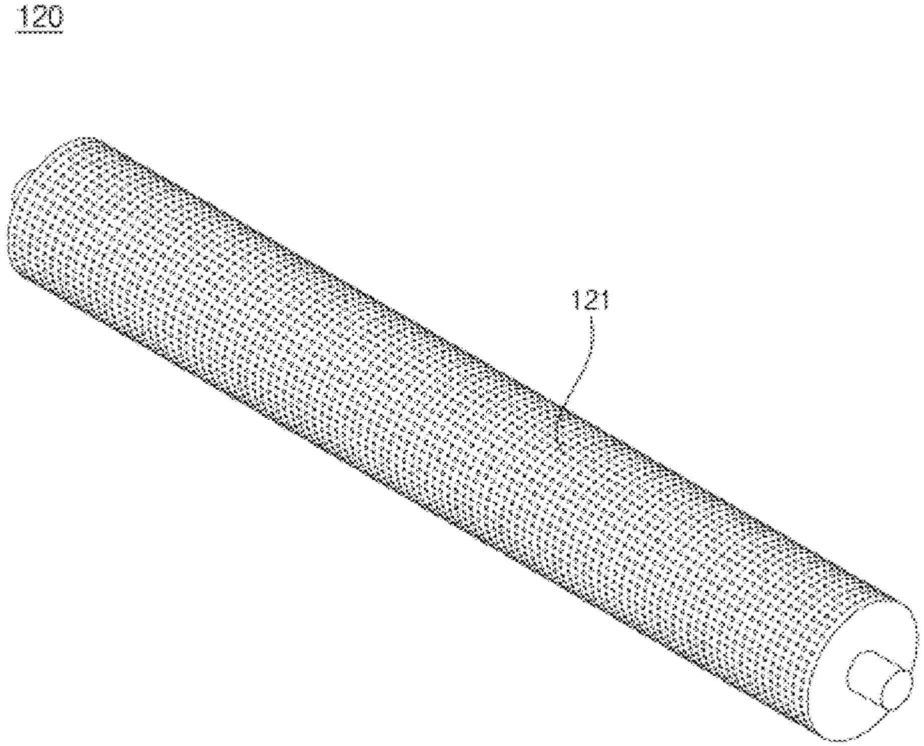

[FIG. 5]
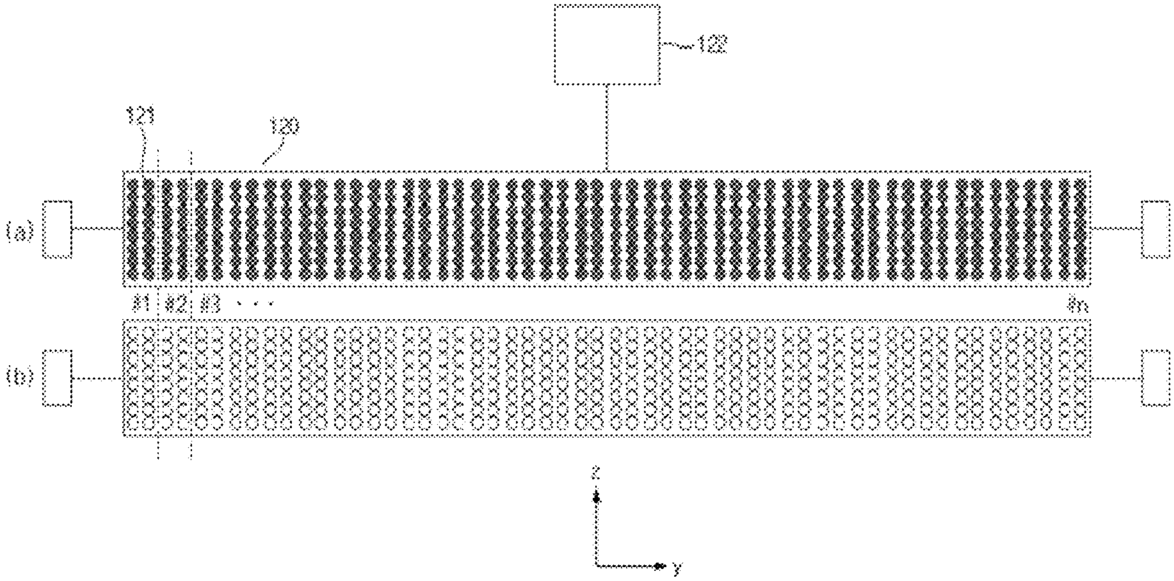

[FIG. 6]
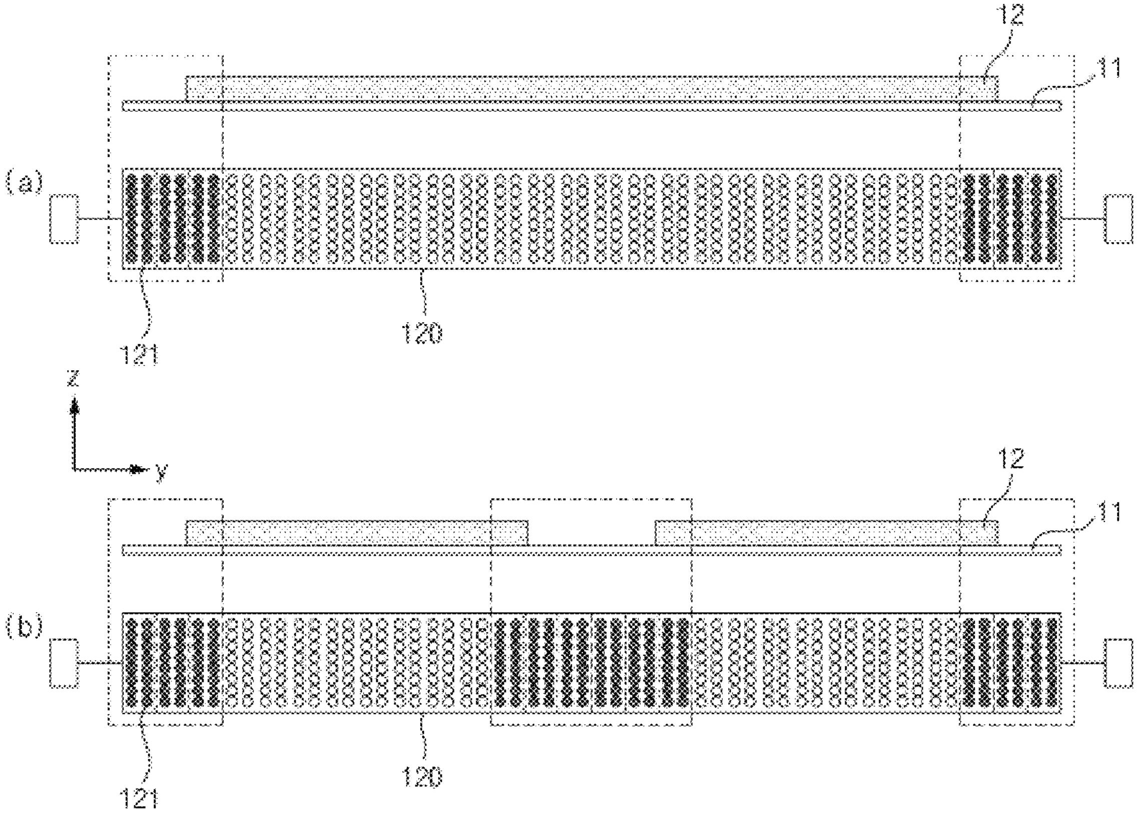
[FIG. 7]
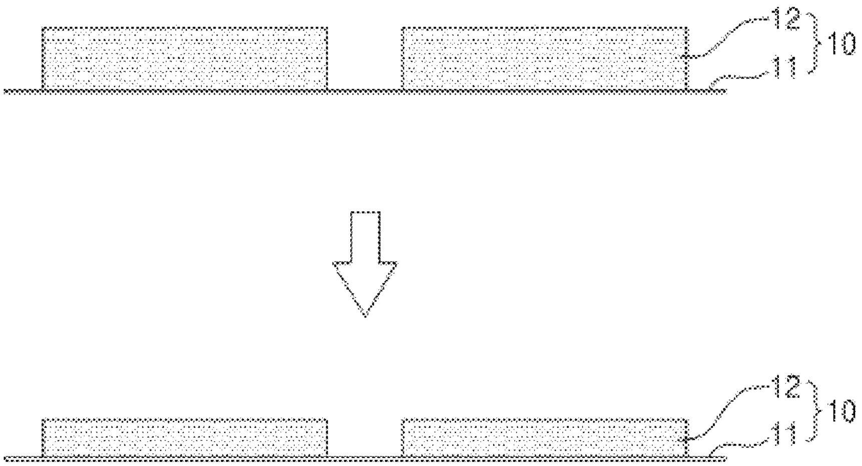

[FIG. 8]
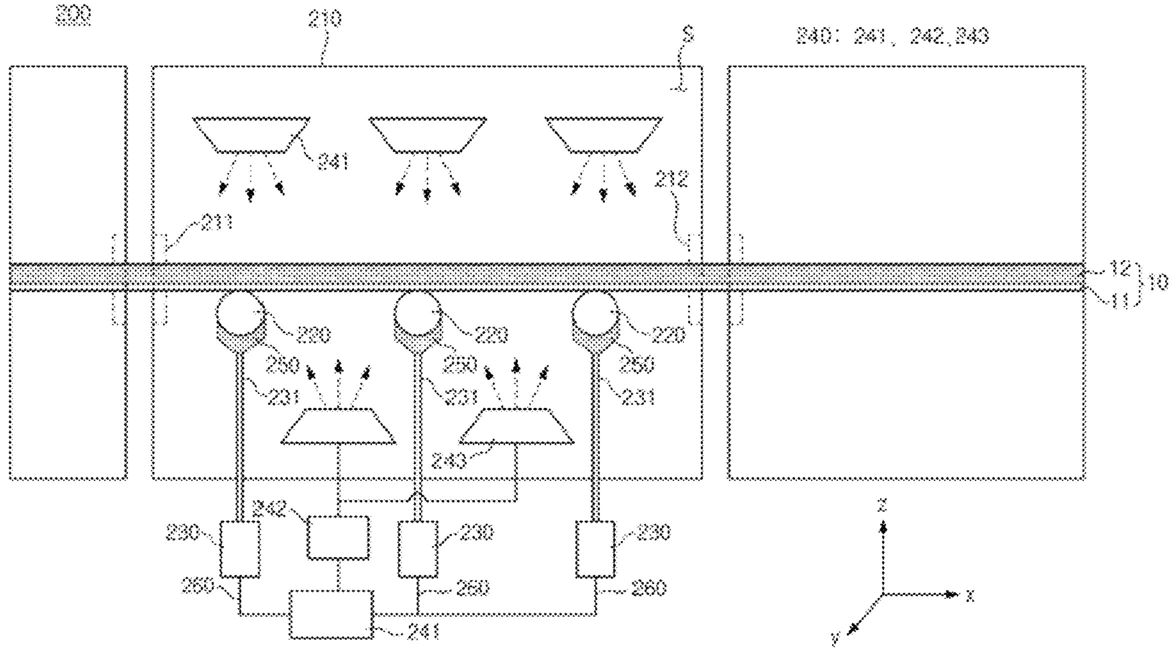

[FIG. 9]
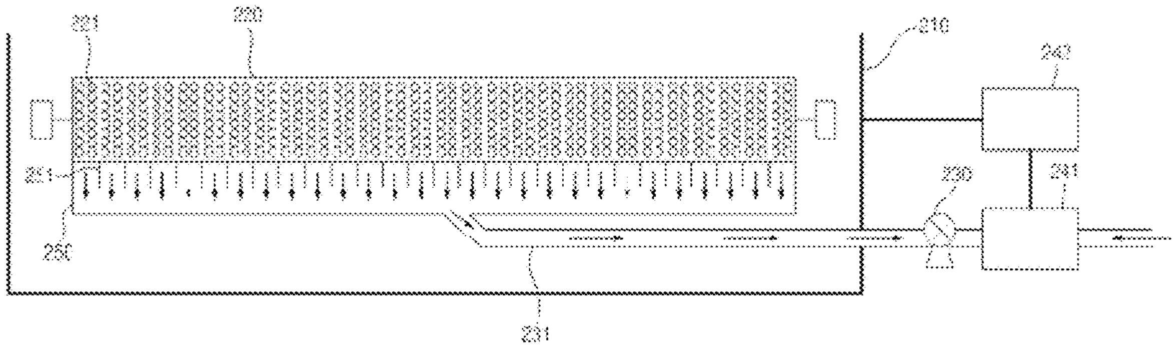

ELECTRODE SHEET DRYING DEVICE AND DRYING METHOD

This application is a national phase entry under 35 U.S.C. § 371 of International Application No. PCT/KR2022/020994 filed on Dec. 21, 2022, which claims the benefit of priority based on Korean Patent Application No. 10-2021-0184673 filed on Dec. 22, 2021, the disclosures of which are incorporated herein by reference.

TECHNICAL FIELD

The present disclosure relates to an electrode sheet drying device and a drying method for mitigating creases in a non-coated part and preventing cracks from occurring at the boundary between a non-coated part and a coated part during a drying process of an electrode sheet.

BACKGROUND OF THE INVENTION

Due to the rapid increase in the use of fossil fuels, the demand for the use of alternative energy or clean energy is increasing, and as part of this, the most actively researched fields are power generation and storage fields using electrochemistry.

Currently, a secondary battery is a representative example of an electrochemical device using such electrochemical energy, and its domain of usage is gradually expanding.

Meanwhile, in order to manufacture an electrode for a secondary battery, a process of coating and drying an electrode slurry in which an electrode active material, a binder, and a solvent are mixed on a current collector is performed. Thereafter, a current collector to which an electrode slurry is applied is dried, and cut and notched to a required size to manufacture an electrode for a secondary battery.

Among the electrode manufacturing processes, the process of drying the electrode slurry requires a lot of cost and time, and the drying process affects the overall efficiency of the electrode manufacturing process.

FIG. 1 is a schematic diagram of a guide roller installed in a conventional electrode drying device, and FIG. 2 illustrates problems that occur when electrodes are dried using a conventional electrode drying device. Referring to these drawings, the electrode sheet 10 is divided into a coated part 12 in which an electrode slurry is applied on the current collector, and a non-coated part 11 in which the current collector is exposed as it is because the electrode slurry is not applied. When drying such an electrode sheet, among the coated parts, the coated part region adjacent to the non-coated part dries faster than the other coated part regions, so that it becomes lighter in weight sooner than the other parts.

Accordingly, the current collector in the coated part region adjacent to the lightened non-coated part supports the electrode sheet 10 and does not come into close contact with a guide roller 20 in the lower part which drives the electrode sheet, so that a current collector lifting phenomenon of a current collector being lifted upward from the guide roller 20 may be induced. In addition, such current collector lifting phenomenon may be further intensified by hot air sprayed upward from the lower hot air supply part installed in the lower part of the electrode sheet toward the electrode sheet.

In this drying process, when the coated part region adjacent to the non-coated part is dried in a lifted state, the non-coated part 11 is stretched by a high temperature, and as shown in FIG. 2, creases (arrows) occur, and cracks C occur at the boundary between the coated part and the non-coated part. In addition, creases and cracks in the non-coated part may further intensify the occurrence of swells in a rolling process, which is a subsequent process, and may cause disconnection in which a part of the non-coated part is cut in a cutting process into a unit electrode.

Therefore, in the process of drying the electrode sheet, it is necessary to develop a technology capable of solving the above problems.

DESCRIPTION

Technical Problem

An object of the present disclosure is to provide an electrode sheet drying device and a drying method capable of mitigating the occurrence of creases in the non-coated part during the drying process of an electrode sheet including a coated part and a non-coated part, and preventing a lifting of a current collector and an occurrence of cracks at the boundary between the non-coated part and the coated part.

Technical Solution

According to the present disclosure, an electrode sheet drying device for drying an electrode slurry coated on a sheet-type current collector includes: a main body part having an accommodation space in the inside for drying, and having an inlet and an outlet; one or more guide rollers installed inside the main body part, and supports and drives an electrode sheet by its rotational motion; and a vacuum pump for applying a negative pressure to the inside of the guide roller, wherein a plurality of perforated holes is formed on the outer circumferential surface of the guide roller, so that an electrode sheet can cling to the guide roller.

In an exemplary embodiment of the present invention, each of the plurality of perforated holes may be configured to be opened and closed.

In an exemplary embodiment of the present invention, the plurality of perforated holes may be distributed over the entire outer circumferential surface of the guide roller.

The electrode sheet drying device according to the present disclosure may further include a perforated hole opening/closing controller for controlling the opening and closing motion of the perforated hole.

In an exemplary embodiment of the present invention, the guide roller may be divided into a plurality of suction zones along the longitudinal direction, and the perforated hole opening/closing controller controls the opening and closing motion of the perforated hole independently for each of the suction zone.

The electrode sheet drying device according to the present disclosure may further include a suction tube located on the lower part of the guide roller, and connected to the vacuum pump.

In an exemplary embodiment of the present invention, a partition dividing the inside of the suction tube may be provided inside the suction tube.

In an exemplary embodiment of the present invention, the suction tube may have a length corresponding to the length of the guide roller.

The electrode sheet drying device according to the present disclosure further includes a hot air supply part configured to spray hot air toward an electrode sheet.

In an exemplary embodiment of the present invention, the hot air supply part may include: a heat exchanger that heats supplied outside air; a blowing fan supplying outside air heated by the heat exchanger to the inside of the main body part; and a hot air spray nozzle installed inside the main body part, and spraying hot air toward an electrode sheet.

In an exemplary embodiment of the present invention, the vacuum pump may be connected to the heat exchanger by a circulation pipe, and air sucked through the vacuum pump may be supplied to the heat exchanger.

In an exemplary embodiment of the present invention, the diameter of the perforated hole may be 0.1 mm to 10 mm.

In addition, the present disclosure provides an electrode sheet drying method using the above drying device.

Advantageous Effects

An electrode sheet drying device and a drying method according to the present disclosure has a plurality of perforated holes formed on the outer circumferential surface of a guide roller that supports and drives an electrode sheet, and as it includes a vacuum pump capable of applying a negative pressure to an inner through hole of the guide roller. As a result, when vacuum is applied, an electrode sheet transferred by the guide roller can come into close contact with the guide roller, thereby mitigating the occurrence of creases in the non-coated part, and preventing lifting of a current collector and the occurrence of cracks.

In addition, in the electrode sheet drying device according to the present disclosure, a plurality of perforated holes is generally formed on the outer circumferential surface of the guide roller, and each of the plurality of perforated holes can be opened and closed, so that a desired position along the width direction of the electrode sheet portion can selectively cling to the guide roller.

BRIEF DESCRIPTION OF THE DRAWINGS

FIG. 1 is a schematic diagram of a guide roller installed on a conventional electrode drying oven.

FIG. 2 is a diagram illustrating problems that occur when electrodes are dried using a conventional electrode drying oven.

FIG. 3 is a schematic diagram of an electrode sheet drying device according to an exemplary embodiment of the present invention.

FIG. 4 is a diagram of a guide roller according to an exemplary embodiment of the present invention.

FIG. 5 is a diagram illustrating an opened/closed state of a perforated hole formed on a guide roller according to an exemplary embodiment of the present invention, wherein FIG. 5(*a*) illustrates a state in which all of a plurality of perforated holes is opened, and FIG. 5(*b*) illustrates a state in which all of a plurality of perforated holes is closed.

FIG. 6 is a conceptual diagram for explaining the effect of a guide roller according to an exemplary embodiment of the present invention.

FIG. 7 is a diagram showing before/after drying an electrode sheet using a drying device according to an exemplary embodiment of the present invention.

FIG. 8 is a schematic diagram of an electrode sheet drying device according to another exemplary embodiment of the present invention.

FIG. 9 is a schematic diagram showing a circulation of air sucked by a vacuum pump in FIG. 8.

REFERENCE NUMERALS

10: ELECTRODE SHEET
C: CRACK
100, 200: DRYING DEVICE
110, 210: MAIN BODY PART
20, 120, 220: GUIDE ROLLER
121, 221: PERFORATED HOLE
130, 230: VACUUM PUMP
131, 231: VACUUM PUMP PIPE
140, 240: HOT AIR SUPPLY PART
241: HEAT EXCHANGER
242: BLOWING FAN
243: HOT AIR SUPPLY NOZZLE
250: SUCTION TUBE
251: PARTITION
260: CIRCULATION PIPE

Best Mode for Carrying Out the Invention

Since the present invention can apply various modifications and includes various embodiments, specific exemplary embodiments will be exemplified in the diagrams and described in detail in the description. However, it should be understood that the present invention is not limited to specific embodiments, and includes all modifications, equivalents or alternatives within the spirit and technical scope of the present disclosure.

The terms "comprise" or "have" are used herein to designate the presence of characteristics, numbers, steps, actions, components or members described in the specification or a combination thereof, and it should be understood that the possibility of the presence or addition of one or more other characteristics, numbers, steps, actions, components, members or a combination thereof is not excluded in advance. In addition, when a part of a layer, a film, a region or a plate, etc. is disposed "on" another part, this includes not only a case in which one part is disposed "directly on" another part, but a case in which a third part is interposed therebetween. In contrast, when a part of a layer, a film, a region or a plate, etc. is disposed "under" another part, this includes not only a case in which one part is disposed "directly under" another part, but a case in which a third part is interposed therebetween. In addition, in this application, "on" may include not only a case of disposed on an upper part but also a case of disposed on a lower part.

In the present specification, the x-axis corresponds to the direction in which the electrode sheet is transferred, the y-axis corresponds to the width direction of the electrode sheet and the length direction of the guide roller, and the z-axis corresponds to the direction perpendicular to the plane of the electrode sheet.

In the present disclosure, the non-coated part refers to a part of the electrode sheet to which the electrode slurry is not applied, and it is a part where the current collector is exposed.

Electrode Sheet Drying Device

The electrode sheet drying device according to the present disclosure is an electrode sheet drying device that dries an electrode slurry coated on a sheet-type current collector and includes: a main body part having an accommodation space in the inside for drying, and having an inlet and an outlet; one or more guide rollers installed inside the main body part, and supports and drives an electrode sheet by its rotational motion; and a vacuum pump for applying a negative pressure to the inside of a through hole of the guide roller, wherein a plurality of perforated holes is formed on the outer circumferential surface of the guide roller, so that an electrode sheet can cling to the guide roller.

When drying an electrode sheet containing a coated part coated with an electrode slurry and a non-coated part not coated with an electrode slurry, the drying speed of the coated part region adjacent to the non-coated part is faster than that of the center part region of the coated part, so that the weight of the coated part adjacent to the non-coated part becomes relatively light, leading to a phenomenon in which the electrode sheet is lifted from the lower guide roller, and accordingly, creases occurred in the non-coated part stretched in a high temperature environment, and cracks were induced at the boundary between the coated part and the non-coated part.

In order to solve the above problem, when drying the electrode sheet including the non-coated part and the coated part, the electrode sheet drying device according to the present disclosure forms a plurality of perforated holes capable of vacuum suction on the outer circumferential surface of the guide roller that supports and drives the electrode sheet, so that the electrode sheet passing on the guide roller comes into close contact with the guide roller due to the vacuum suction force, and thus the electrode sheet is not lifted from the coated part region adjacent to the non-coated part. Accordingly, the electrode sheet drying device according to the present disclosure has an effect of mitigating the occurrence of creases in the non-coated part or cracks at the boundary between the coated part and the non-coated part after drying.

Hereinafter, specific embodiments of an electrode sheet drying device according to the present disclosure will be described in detail with reference to the accompanying drawings.

First Embodiment

FIG. 3 is a schematic diagram of an electrode sheet drying device according to an exemplary embodiment of the present invention, FIG. 4 is a diagram of a guide roller according to an exemplary embodiment of the present invention, and FIG. 5 is a diagram illustrating an opened/closed state of a perforated hole formed on a guide roller according to an exemplary embodiment of the present invention.

Referring to these diagrams, the electrode sheet drying device 100 according to the present disclosure is largely divided into a main body part 110, a guide roller 120, and a vacuum pump 130, and a plurality of perforated holes 121 are formed on the outer circumferential surface of the guide roller 120.

The electrode sheet 10 dried by the drying device 100 of the present disclosure may include a sheet-type current collector 11, and an electrode slurry applied to one or both surfaces of the current collector 11. That is, the electrode sheet 10 of the present disclosure is prepared by coating the electrode slurry on one surface of a sheet-type current collector, and the electrode slurry 12 of the electrode sheet 10 prepared in this way is dried by the electrode drying device 100 of the present disclosure.

The main body part 110 constitutes a main frame of the electrode sheet drying device 100, and has an accommodation space S for drying in the inside. In addition, an inlet 111 into which the electrode sheet 10 to be dried is put is provided on one side of the main body part 110, and an outlet 112 is provided on the other side so that the electrode sheet 10 to be dried that has undergone a drying process can be discharged.

A drying means for drying the electrode slurry 12 is installed inside the main body part 110, and specific examples of such a drying means is a hot air spray nozzle for spraying hot air toward the electrode sheet, and a heater. One or two or more hot air spray nozzles and heaters may be installed in the upper part of the electrode sheet 10.

The guide roller 120 serves to transfer the electrode sheet 10 in one direction so that the electrode sheet 10 passes through the accommodation space S serving as a drying oven through the inlet 111 and the outlet 113.

Specifically, the guide roller 120 can rotate in one direction by receiving power from a motor (not shown), and one or more of these guide rollers 120 may be installed inside the main body part 110.

As shown in FIG. 4, the guide roller 120 of the present disclosure has a cylindrical shape, and a plurality of perforated holes 121 for clinging to the electrode sheet is formed on the outer circumferential surface of the guide roller 120. Also, the plurality of perforated holes 120 may be evenly distributed over the entire outer circumferential surface of the guide roller 120.

A through hole is provided inside the guide roller 120, and when a vacuum is applied to the inside of the guide roller 120 through the through hole, the electrode sheet 10 driving on the guide roller 120 may cling to the outer circumferential surface of the guide roller 120 due to a pressure difference between the inside and the outside of the guide roller 120.

Each of the plurality of perforated holes 121 may be configured to be opened and closed. FIG. 5 is a diagram showing an opened/closed state of perforated holes according to an exemplary embodiment of the present invention. FIG. 5(*a*) shows a state in which all of the perforated holes are opened, and FIG. 5(*b*) shows a state in which all of the perforated holes are closed.

A plurality of perforated holes 121 are generally formed on the guide roller 120, and as each of the plurality of perforated holes 121 can be opened and closed, some of the perforated holes 121 can be controlled to remain in an opened state, and the rest of the perforated hole 121 to be in a closed state, so that a region of the electrode sheet that clings to the guide roller 120 can be freely selected.

In addition, since the guide roller 120 of this embodiment can freely select the region of the electrode sheet to cling to the guide roller 120, there is an advantage in that the formation position of the perforated hole 121 does not have to be changed whenever the width of the non-coated part to which the electrode slurry is not applied, the width of the coated part to which the electrode slurry is applied, and the applying pattern of the electrode slurry, etc. are changed.

Referring to FIG. 6, when the non-coated part 11 of the electrode sheet 10 is formed at both edges with respect to the width direction (y-axis direction) of the electrode sheet 10, while the electrode sheet is dried by passing through the main body 110, a phenomenon in which the center part of the electrode sheet 10 is lifted from the guide roller due to the weight of the electrode slurry does not occur, but a phenomenon in which the non-coated part 11 of the electrode sheet 10 and its periphery are lifted may occur. Therefore, as shown in FIG. 6(*a*), Since the phenomenon may occur, in order to cling only the corresponding part, as shown in FIG. 6(*a*), the perforated holes formed within both edge regions (within the dotted line square box) in the longitudinal direction (y-axis direction) of the guide roller 120 can be controlled to be in an opened state, and the rest of the perforated holes can be controlled to be in a closed state.

In addition, when the electrode slurry is applied so that the coated part 12 and the non-coated part 11 alternately appear along the width direction (y-axis direction) of the electrode sheet 10, as shown in FIG. 6(*b*), the perforated holes formed within the region of the guide roller 120 corresponding to the non-coated part 11 and its surroundings (within the dotted square box) can be controlled to be opened, and the remaining perforated holes can be controlled to be closed.

Referring to FIG. 5, the drying device 100 according to the present disclosure may further include a perforated hole opening/closing controller 122 to control the opening/closing state of each of the plurality of perforated holes 121.

In addition, the guide roller 120 of the present disclosure is divided into a plurality of suction zones along the longitudinal direction (y-axis direction), and the perforated hole opening/closing controller 122 may independently control the opening and the closing motion for each of the suction zone.

Referring to FIG. 5, the guide roller 120 of the present disclosure may be divided into n suction zones (#1, #2, #3 . . . #n) along the longitudinal direction (y-axis direction). In addition, a plurality of perforated holes 121 may be formed in a single suction zone.

The perforated hole opening/closing controller 122 sets the perforated holes formed in a suction zone #1 and suction zone #2 to an opened state, and the perforated holes formed in the rest of the suction zones in a closed state. Since the perforated holes formed in the suction zone #1 and the suction zone #2 of the guide roller are in an opened state, the electrode sheet can cling to the guide roller through these perforated holes.

The perforated hole opening/closing controller 122 does not uniformly open and close the plurality of perforated holes 121 formed throughout the guide roller 120, but rather divides the guide roller 120 into several suction zones (#1, #2, #3 . . . #n), so that it can control the opening and closing motion of the perforated holes 121 for each suction zone. That is, only the perforated holes in the suction zone corresponding to the region where the electrode sheet needs to cling to the guide roller may be selectively controlled to be opened, and the perforated holes in the rest of the suction zones may be controlled to be closed. Accordingly, it is possible to select an suction region along the width direction (y-axis direction) of the electrode sheet 10, and since the suction force due to the application of vacuum is not transmitted to the region of the electrode sheet where suction is unnecessary, there is also an effect of preventing damage to the electrode sheet or the current collector.

During suction by a vacuum application, in order not to damage an electrode of the coated part and a current collector of the non-coated part, the perforated hole 121 preferably has a small diameter. Specifically, the range of the diameter may be 0.1 mm to 10 mm, preferably 0.2 mm to 7.5 mm, and more preferably 0.5 mm to 5 mm.

In addition, the shape of the perforated hole 121 is not particularly limited, but may be one or more selected from circular, elliptical, and polygonal shapes.

The vacuum pump 130 applies a negative pressure to the inside of the through hole of the guide roller 120. As the pressure inside the guide roller 120 is reduced by the vacuum pump 130, the electrode sheet 10 facing the guide roller 120 may cling to the outer circumferential surface of the guide roller.

The vacuum pump 130 may be installed outside of the main body part 110, and the vacuum pump 130 may apply negative pressure to the inside of the guide roller 120 through a vacuum pump pipe 131.

Referring to FIG. 3, the electrode sheet drying device 100 according to the present disclosure may include a hot air supply part 140 for drying the electrode subjected to drying by spraying hot air (arrow) toward the electrode sheet 10 driving in one direction within the main body part 110. In addition, although not shown in FIG. 3, in order to increase drying efficiency, one or two or more heaters (not shown) supplying radiant heat to the electrode sheet may be installed inside the main body part 110. Such a heater may be used without limitation as long as it is a known heater used in an electrode sheet drying device, and an infrared heater may be specifically exemplified.

The hot air supply part 140 may be installed in the upper and the lower part of the electrode sheet, respectively. The hot air supply part installed in the upper part of the electrode sheet may spray hot air with a downward current toward the electrode, and the hot air supply part installed in the lower part of the electrode sheet may spray hot air with an upward current toward the electrode.

The drying device 100 according to the present disclosure may include one or more transfer rollers for transferring an electrode sheet in the transferring direction (x-axis direction) inside the main body part 110, and some or all of these transfer rollers may be composed of the guide rollers described above.

FIG. 7 is a diagram showing before/after drying an electrode sheet using the drying device according to the present disclosure. Comparing FIG. 7 to FIG. 2, as the drying device 100 according to the present disclosure includes a guide roller 120 having a plurality of perforated holes 121 capable of clinging to the electrode sheet 10, so that drying occurs relatively quickly in some parts of the electrode sheet 10, and as a result, the electrode sheet 10 is dried in a state in which it is lifted from the transfer roller due to a reduction in weight, thereby having an effect of dramatically improving the occurrence of creases in the non-coated part, or the occurrence of cracks at the boundary region between the non-coated part and the coated part.

Second Embodiment

FIG. 8 is a schematic diagram of an electrode sheet drying device according to another exemplary embodiment of the present invention, and FIG. 9 is a schematic diagram showing a circulation of air sucked by a vacuum pump in FIG. 8.

Referring to these diagrams, the electrode sheet drying device 200 according to the second embodiment of the present invention is largely divided into a main body part 210, a guide roller 220, a vacuum pump 230, a hot air supply part 240:241,242,243, and a suction tube 250, and a plurality of perforated holes 221 is formed on the outer circumferential surface of the guide roller 220.

Since the main body part 210, the guide roller 220, the vacuum pump 230, and the hot air supply part 240 have been described in detail above, the suction tube 250 will be described in detail.

The suction tube 250 according to the present disclosure is located in the lower part of the guide roller 220, and the suction tube 250 may be mechanically coupled to the guide roller 220 so that the guide roller 220 can rotate.

The suction tube 250 may be extended along the longitudinal direction (y-axis direction) of the guide roller 220, and its length in the extension direction (y-axis direction) may correspond to the length in the longitudinal direction (x-axis direction) of the guide roller 220.

The inside of the suction tube 250 may be empty so that air can flow. One side of the suction tube 250 is directed toward the guide roller 220 in the upper part (with respect to the z-axis direction), the other side is connected to the vacuum pump pipe 231 in the lower part (with respect to the z-axis direction), and the vacuum pump pipe 231 may be connected to the vacuum pump 230 installed outside of the main body part 210.

Accordingly, when a negative pressure is applied by the vacuum pump 230, a pressure difference between the inside of the guide roller 210 and the outside of the guide roller occurs, so that the outside air is introduced to the inside of the guide roller 220 through the perforated hole 221 of the guide roller 220, and the introduced air may be sucked into the vacuum pump 230 by sequentially passing the suction tube 250 and the vacuum pump pipe 231. Also, due to the suction force of the air, the electrode sheet 10 may cling to the surface of the guide roller 220.

The suction tube 250 may be paired with the guide roller 220, so that each guide roller 220 is coupled to a single suction tube 250.

The vertical section of the suction tube 250 may have a funnel shape, and accordingly, when a vacuum is applied by the vacuum pump, a negative pressure may be more effectively generated inside the suction tube 250.

Referring to FIG. 9, a plurality of partitions 251 dividing up the inner space of the suction tube may be formed inside the suction tube 250. By these partitions 251, the guide roller 220 may be divided into several suction zones. In addition, when the above-described perforated hole opening/closing controller controls the opening and closing motion of the perforated hole 221 for each suction zone, the partition 251 increases the speed of outside air flowing into the guide roller 220 in the suction zone where the perforated hole is open, thereby doubling the suction force of the electrode sheet 10.

In one specific example, the hot air supplying part 240 may include a heat exchanger 241, a blowing fan 242, and a hot air spray nozzle 243.

The heat exchanger 241 may be configured to heat the outside air supplied to the main body part 210, the blowing fan 242 may be configured to supply the outside air heated by the heat exchanger 241 to the hot air spray nozzle 243 installed inside the main body part 210, and the hot air spray nozzle 243 may be installed inside the main body part 210, and may be configured to spray hot air toward the electrode sheet 10.

After the hot air supplied into the accommodation space S of the main body part 210 is used for the electrode subjected to drying, a part of the hot air is circulated and the rest is exhausted to the outside.

In addition, in the hot air supplying part, a damper (not shown) operated by an actuator (not shown) may be installed in a duct (not shown) connected to the inside of the accommodation space S of the main body part 210. The amount of hot air supplied into the accommodation space can be adjusted through the damper.

In an exemplary embodiment of the present invention, the vacuum pump 230 may be connected to the heat exchanger 241 through a circulation pipe 260.

In this case, the air sucked through the vacuum pump 230 may be circulated to the inside of the main body part by passing the heat exchanger 241 and the blowing fan 242, thereby having an effect of saving energy.

Electrode Sheet Drying Method

The present disclosure provides a method for drying an electrode sheet using the above-described drying device.

The electrode sheet drying method according to an exemplary embodiment of the present invention includes:

supplying the electrode sheet to the aforementioned drying device; applying a negative pressure to the inside of the guide roller using a vacuum pump so that the electrode sheet clings to the guide roller during the drying process.

In the negative pressure application process, all of the plurality of perforated holes may be controlled to be in an open state so that the entire region of the electrode sheet clings to the guide roller, or as described above, only the perforated holes corresponding to the portion of the electrode sheet that requires suction may be selectively controlled to be in an opened state.

The above description only illustratively described the technical idea of the present invention, so those skilled in the art to which the present disclosure pertains may make various modifications and variations without departing from the essential characteristics of the present disclosure. Therefore, the diagrams disclosed in the present disclosure are not intended to limit the technical idea of the present invention, but are for explanation, and the technical scope of the present invention is not limited by these diagrams. The scope of protection of the present invention should be interpreted by the claims below, and all technical scope within the scope equivalent thereto should be construed as being included in the scope of rights of the present disclosure.

The invention claimed is:

1. An electrode sheet drying device for drying an electrode slurry coated on a sheet-type current collector, comprising:

a main body part having an accommodation space for drying, the main body having an inlet and an outlet;

at least one guide roller installed inside the main body part wherein the guide roller supports and drives an electrode sheet by rotational motion;

a vacuum pump for applying a negative pressure to the inside of the guide roller; and a controller for controlling the opening and closing of a plurality of perforated holes, wherein the plurality of perforated holes are formed on an outer circumferential surface of the guide roller such that the negative pressure is present in the perforated holes and configured to cling the electrode sheet to the guide roller, wherein each of the plurality of perforated holes are configured to be opened and closed, and wherein the guide roller is divided into a plurality of suction zones along a longitudinal direction of the guide roller, and the controller is configured to control the opening and closing of the perforated holes for each of the plurality of suction zones independently.

2. The electrode sheet drying device of claim 1, wherein the plurality of perforated holes are distributed over the entire outer circumferential surface of the guide roller.

3. The electrode sheet drying device of claim 1, further comprising, a suction tube located at the lower part of the guide roller, wherein the suction tube is connected to the vacuum pump.

4. The electrode sheet drying device of claim 3, wherein the suction tube includes a partition positioned to divide the inside of the suction tube.

5. The electrode sheet drying device of claim 3, wherein the suction tube has a length corresponding to the length of the guide roller.

6. The electrode sheet drying device of claim 1, further comprising, a hot air supply part configured to spray hot air toward an electrode sheet.

7. The electrode sheet drying device of claim 6, wherein the hot air supply part, comprising:

a heat exchanger configured to generate heated air;

a blowing fan configured to supply the heated air to the accommodation space; and a hot air spray nozzle configured to spray hot air toward the electrode sheet.

8. The electrode sheet drying device of claim 7, wherein the vacuum pump is connected to the heat exchanger by a circulation pipe such that air sucked through the vacuum pump is supplied to the heat exchanger.

9. The electrode sheet drying device of claim 1, wherein diameter of the perforated holes range from 0.1 mm to 10 mm.

10. A method for drying an electrode sheet comprising: drying the electrode sheet with the electrode sheet drying device of claim 1.

* * * * *